United States Patent [19]
Ishii et al.

[11] Patent Number: 4,504,180
[45] Date of Patent: Mar. 12, 1985

[54] MULTI-HEADED SCREW

[75] Inventors: Nobuyuki Ishii, Ichikawa; Yukihiko Yamada, Yamato, both of Japan

[73] Assignee: Kyodo Electric Co., Ltd., Tokyo, Japan

[21] Appl. No.: 344,620

[22] Filed: Feb. 1, 1982

[30] Foreign Application Priority Data

Apr. 27, 1981 [JP] Japan .................... 56-60916[U]

[51] Int. Cl.³ ............................................ F16B 31/00
[52] U.S. Cl. ................................. 411/5; 411/373;
411/402; 411/539; 411/910
[58] Field of Search ........................... 411/1–7,
411/371–373, 910, 911, 901, 902, 539; 292/307
B; 339/22 B, 37, 39

[56] References Cited

U.S. PATENT DOCUMENTS

| 790,142 | 5/1905 | Lichetti | 292/307 B |
| 3,289,524 | 12/1966 | Rubin | 411/7 |
| 3,383,458 | 5/1968 | Raskhodoff et al. | 339/22 B |
| 3,444,775 | 5/1969 | Hills | 411/5 |
| 3,561,317 | 2/1971 | Rowell | 411/5 |
| 3,742,583 | 7/1973 | Devlin et al. | 411/2 X |
| 3,812,757 | 5/1974 | Reiland | 411/5 |
| 3,909,098 | 9/1975 | Reed et al. | 339/22 B |
| 4,029,379 | 6/1977 | Kotala et al. | 339/22 B |
| 4,219,693 | 8/1980 | French | 339/39 X |
| 4,372,593 | 2/1983 | Kesselman | 292/307 B |

FOREIGN PATENT DOCUMENTS

| 2625142 | 12/1977 | Fed. Rep. of Germany | 411/3 |
| 113751 | 9/1979 | Japan | 411/2 |
| 2067699 | 7/1981 | United Kingdom | 411/5 |

Primary Examiner—Gary L. Smith
Assistant Examiner—Thomas J. Dubnicka
Attorney, Agent, or Firm—Polster, Polster & Lucchesi

[57] ABSTRACT

A screw member having a plurality of heads by providing one or more thin neck portions to be sheared at a predetermined torque, in which a collar having a skirt portion with its one part being cut away is fitted on the thin neck portion from the lateral side to expose the outer head part alone and to engage the cap member fitted from the side of the bearing surface of the inner head part of the screw member, and the cap member is inserted between the skirt of the collar and the inner head part to thereby prevent the collar from slipping out.

6 Claims, 4 Drawing Figures

MULTI-HEADED SCREW

BACKGROUND OF THE INVENTION (a) Field of the Invention

This invention relates to a screw member such as bolt or a nut, for use in joining together various component parts in electric appliances. More particularly, it is concerned with a multi-headed screw member having a thin neck portion (or portions) to be sheared with a predetermined tightening torque.

Whether the screw is tightened with a predetermined torque or not, is verified in general by use of a torque wrench. However, if a number of the screws are used, it is often very difficult to check and verify the tightening torque for each and every bolt or nut. Moreover, failure occurs sometimes in such verification.

Also, when electrically conductive members in an electric appliance are to be joined together by the screws, if the tightening force is insufficient, the conductors generate heat due to insufficient contact between pairs of them so as to be liable to cause unexpected troubles and disorders. On the other hand, if the tightening force is excessive, there is a possibility of the screws and connected parts of the conductors being damaged.

(b) Description of Prior Art

In view of the problems described above, various sorts of screw members have been proposed, capable of exerting a predetermined tighening force without use of the torque wrench.

Such screw members have head parts divided into an inner head part and an outer head part by a thin neck portion to be sheared at a predetermined tightening torque. The thin neck portion is defined at approximately the middle portion of the screw member head where a screw member driving tool such as wrench, spanner, etc. is applied, (e.g., to the head 2C of a bolt 1 as shown in FIG. 1 of the accompanying drawing).

The double-headed bolt 1 shown in FIG. 1 is tightened by applying a tool on the outer head part 2C. When the tightening torque reaches a predetermined value, the thin neck portion 3 breaks (shears), and the tightening operation is complete. Further tightening or loosening of the already tightened bolt can be done by applying and turning the screw driving tool on the inner head part 2A which remains after the outer head part 2C is twisted off.

As stated in the foregoing, the bolt 1 should always be turned by applying the screw driving tool on and around the outer head part 2C. However, in case many bolts 1 are being assembled, or the work is done in a hurry, it sometimes happens that the tightening tool is mistakenly applied to the inner head part 2A and turned. In such case, since the thin neck portion 3 is not sheared, no determination can be made as to whether or not a predetermined tightening torque has been attained and it may happen that the screw is subjected to excessive tightening.

In other occasions, after the screw driving tool is applied on the outer head part 2C and the thin neck portion 3 is accurately sheared at a predetermined tightening torque, when an ordinary screw driving tool having no torque control function is applied on the remaining inner head part 2A to loosen the bolt 1 and re-tighten the same for re-assembling the electric appliance, etc. due to erroneous assembly, the fact that the bolt has been re-tightened cannot be recognized visually, with the result that the effect of controlling the tightening torque, which the bolt of this sort aims at, is negated.

Also, as in the case of a nut 2 shown in FIG. 3 and a bolt 1 in FIG. 4, these nuts and bolts have triple heads, i.e., an inner head part 2A, a middle head part 2B, and an outer head part 2C divided by a large diameter neck portion 3A and a small diameter neck portion 3B, the two necks being sheared with differing tightening torque.

These triple-headed bolts and nuts are tightened by applying a screw driving tool to the outer head part 2C thereof, and then turning the tool. When the tightening torque reaches a first predetermined value, the small diameter neck portion 3B is sheared. Subsequently, the screw driving tool is applied to the middle head part 2B thereof, and then the tool is turned. When the tightening torque reaches a second predetermined value, the large diameter neck portion 3A is sheared, whereby the tightening work is completed. With this type of screw member, there can be performed two-stage tightening, i.e, so-called provisional tightening and final tightening.

Even in this case, there is the same possible mistreatment following initial installation as is the case with the double-headed bolt. In the case of the nut, there is also the possibility that the nut will be inverted accidentally, negating the twist-off function entirely.

SUMMARY OF THE INVENTION

In view of the problems discussed above, it is an object of the present invention to provide a screw member of the type having multiple heads, with one or more thin neck portions between them to be sheared at a predetermined tightening torque, in which visible evidence of the fact of loosening and tightening after the screw is initially tightened is provided, and the handling of the screw member at the inspection and maintenance of the device as assembled is facilitated.

According to the present invention, generally stated, a screw member is provided with a plurality of heads disposed in a longitudinal direction of the screw member, each of the plurality of heads being interconnected with its adjacent one by a neck portion, the neck portion being so thin as to be sheared when a tightening torque is applied thereto which exceeds a predetermined value. A collar member covers the heads partially, with at least the outermost one of the heads remaining exposed so that a screw member driving device can engage it, the collar member being detachably engageable around a neck portion. A cap member surrounds at least the innermost one of the heads and cooperates with the collar member whereby each of the heads except the outermost one is substantially enclosed by at least one of said collar and cap members.

There has thus been outlined, rather broadly, the more important feature of the present invention in order that the detailed description thereof that follows may be better understood, and in order that the present contribution to the art may be better understood, and in order that the present contribution to the art may be better appreciated. There are, of course, additional features of the invention that will be described hereinafter and which will form the subject of the claims appended hereto. Those skilled in the art will appreciate that the conception, upon which this disclosure is based may readily be utilized as a basis for the designing of other structure for carrying out the several purposes of the present invention. It is important, therefore, that the claims be regarded as including such equivalent construction so far as they do not depart from the spirit and scope of the present invention.

BRIEF DESCRIPTION OF THE ACCOMPANYING DRAWING

Specific embodiments of the present invention have been chosen for the purpose of illustration and description, and are shown in the accompanying drawing, forming a part of the specification, in which.

DETAILED DESCRIPTION OF PREFERRED EMBODIMENT

Figure 1:
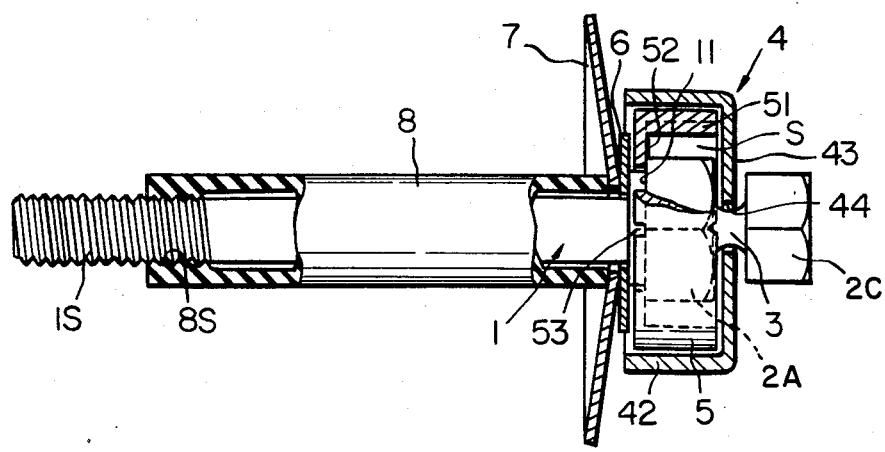
FIG. 1 is a side elevational view, partly in longitudinal cross-section, of a double-headed bolt, to which the present invention is applied.
Figure 2:
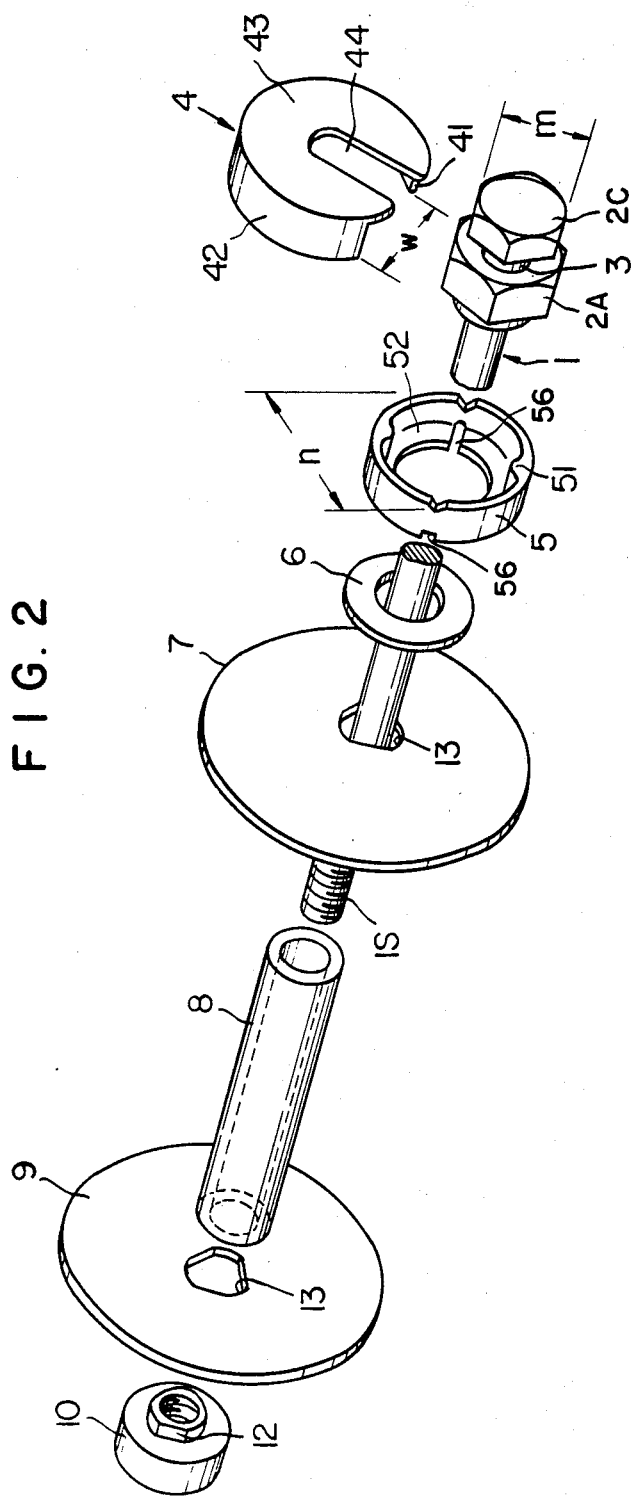
FIG. 2 is an exploded view of the double-headed bolt.

Referring now to the drawings, and particularly to FIGS. 1 and 2 for one illustrative embodiment of the invention, a bolt 1 has two heads, an inner head 2A and an outer head 2C, with a neck 3 between them. In the embodiment shown in FIG. 3, the screw member is a nut 2, and in the embodiment shown in FIG. 4, the screw member is a bolt, but in both those embodiments, the member is provided with three heads, an inner head 2A, an intermediate head 2B and an outer head 2C with a neck 3A between heads 2A and 2B and neck 3B between heads 2A and 2C. In each of the embodiments, the inner head 2A has a step in its lower edge, to provide an integral riser 21 and a radial undersurface 11. In the embodiment shown in FIGS. 1 and 3, the surface 11 is interrupted by notches 53.

A collar 4 has a front face 43 and a skirt portion 42. The front face 43 has a cut out slot 44, substantially U-shaped in plan, which opens at the edge of the face at a notch 41 in the skirt 42. The notch is wide enough to admit the head 2A of FIGS. 1 and 2 and 2B of FIGS. 3 and 4, and the slot is of a width to permit loose fitting around the thin neck portion 3 of FIGS. 1 and 2 or 3B of FIGS. 3 and 4.

Figure 3:
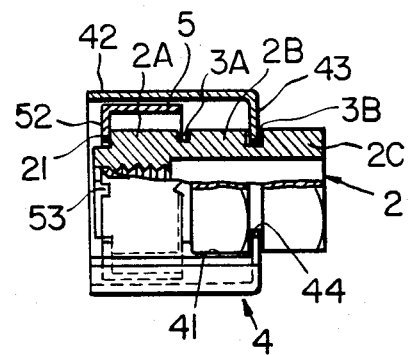
FIG. 3 is a side elevational view, partly in longitudinal cross-section, of the main part of a triple-headed nut, to which the concept of the present invention is applied.

The skirt 42 of the collar 4 in the embodiments shown in FIGS. 1 and 2 is formed in a length to cover the outer periphery of the inner head part 1A, while the skirt 42 of the collar 4 in the embodiment shown in FIG. 3 is formed in a length to cover the middle head part 2B, the large diameter neck portion 3A, and the inner head part 2A.

The width w of the opening of the notched skirt portion 41 is such that it is greater than a width m between opposite flats of the head part to be covered, and smaller than an outer diameter n of a cap member 5.

The cap member 5 is dimensioned and configured to fit loosely around the outer periphery of the inner head part 2A to make it impossible for a screw driving tool to engage the inner head part 2A, or else it is made of a material which leaves a mark on the head part to indicate that the tool has been engaged therewith. The configuration of the cap member 5 may be arbitrarily chosen besides the cylindrical shape as illustrated, such as oval, pentagonal, and so forth. The material used for the cap member may be copper, aluminum, synthetic resins, etc.

It is also possible to construct the cap member in such a manner as shown in FIGS. 1 and 2 that the inner diameter of the cap member 5 is increased so as to provide a space S between it and the outer periphery of the inner head part 2A, and to form protuberances 51 on the inner periphery of the cap member 5 to make the space S have a specific configuration so that no loosening and tightening operations of the inner head part 2A can be effected with a tool other than a socket type torque wrench having a specific outer shape complementary to the shape of the surfaces defining the space S.

The cap member 5 has an inwardly directed flange 52 at its one end. The flange 52 engages the radial surface 11 of the inner head 2A. Alternatively, in place of the flange 52, a plurality of inwardly directed projections are formed to engage the notches 53. In this instance, the engagement member also serves to prevent the cap member 5 from rotating.

The thickness of the inwardly directed flange 52 and the inwardly directed projections of cap member 5 should be smaller than the height of the stepped part 21 and the depth of the notches 53, so that, when the bolt 1 and the nut 2 are tightened, pressure from a flat washer 6, a spring washer 7, and other parts contacting the lower bearing surface may not be exerted on the flange 52 and the projections rather than on the lower surface of the head 2A.

Moreover, in order to secure the engagement of the cap member 5 to the bolt 1 or the nut 2, the inward flange 52 may be adhered to the annular stepped parts 11, 21 of the inner head part 2A, or they may be fitted together in a tight fit utilizing the elasticity of the material of which the cap member 5 is made.

As shown in the embodiment illustrated in FIG. 2, after the cap member 5 is fitted on the inner head part 2A, and the flat washer 6, the spring washer 7, and other required parts are fitted on the bolt 1 to be laid over the cap member 5, these washers 6, 7 and the cap member 5 are urged to the inner head part 2A by one end of an insulating sheath 8 fitted on and along the bolt 1 up to the bearing surface of the head of the bolt, and then a female screw 85 formed on the other end part of the insulative sheath 8 is engaged with the thread 15 of the bolt 1.

Figure 4:
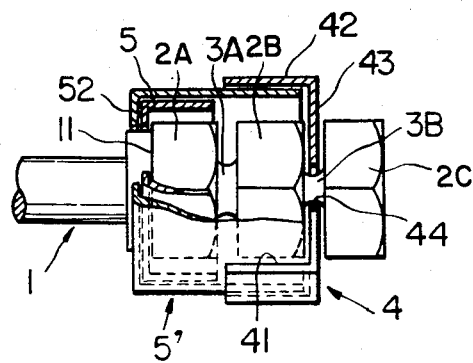
FIG. 4 is a side elevational view, partly in longitudinal cross-section, of the main part of the head part of a triple-headed bolt, to which the concept of the present invention is applied.

FIG. 4 shows a modified embodiment, wherein the present invention is applied to the triple-headed bolt. In this embodiment, the skirt 42 of the collar 4 covers only the middle head part 1B, and the cylindrical cap member 5 covers only the inner head part 2A. A separate and auxiliary cap member 5' surrounding the outer periphery of the cap member 5 is formed in a length to fit inside the skirt 42 of the collar 4.

As shown in FIG. 1, the bolt 1, on which the collar 4, the cap member 5, the flat washer 6, the spring washer 7, and the insulative sheath 8 are set beforehand, is inserted into a bolt hole of an object to be assembled, then a spring washer 9 and a nut 10 are fitted on the screw thread 15, and held against rotation as by pressing with fingers, and the screw driving tool is applied on the outer head part 2C of the bolt 1, and turned for tightening the same. When a predetermined tightening torque is reached, the thin neck portion 3 is sheared, whereby the tightening operation is completed. Upon completion of the tightening, the collar 4 is removed from the inner head part 2A. The nut 10 has its outer periphery formed in a circular shape so that no socket, box or open end wrench or the like can be applied thereon. Also, a square shaft 12 and a square hole 13 for preventing rotation are provided between the nut 10 and the spring washer 9.

Thereafter, when it becomes necessary to loosen or tighten the bolt 1 for maintenance and inspection, the cap member 5 surrounding the outer periphery of the inner head part 2A is cut with a knife, etc., or a screw driver, etc. is inserted into a slit 56 formed in the flange 52 of the cap member 5 to break and remove the cap member, after which the tightening work is effected.

As the consequence of this, those bolts 1 having no cap member 5 fitted on the head part, or having the cap member 5 fitted in the reversed direction indicate the fact that loosening or tightening work was done for some reason or other on the inner head part 2A of the bolt 1 by applying a screw driving tool thereon. This provides a substantially fool-proof measure in that, at the time of checking for the work to be done later, those bolts as mentioned above are replaced with fresh spare bolts with the collar 4 and other members being set thereon, thereby controlling a constant tightening torque of the bolt 1.

In the case of the triple-headed nut 2 shown in FIG. 3, the tool is applied for tightening on the outer head part 2C as is the case with the bolt in FIG. 1. As soon as the predetermined tightening torque is reached, and the small diameter neck portion 3B is sheared, the collar 4 is removed.

Subsequently, at the time of further tightening of the nut, the screw driving tool is applied on the middle head part 2B, and the tightening is continued until the large diameter neck portion 3A is sheared. In this instance, since the outer periphery of the inner head part 2A is covered with the cap member 5, there is no possibility of the tool being applied on the inner head part 2A by mistake.

Thereafter, when necessity arises for loosening or tightening the nut 2 for maintenance, inspection, and so on, the cap member 5 is removed by breaking as is the case with the bolt 1 in FIG. 1.

In the case of the triple-headed bolt 1 shown in FIG. 4, the screw driving tool is first applied for tighening on the outer head part 2C to shear the small diameter neck portion 3B, followed by removing the collar 4. In the case of further tightening of the bolt, the auxiliary cap member 5' surrounding the middle head part 2B is sheared and removed, and then the tool is applied on this middle head part 2B and the tightening is continued until the large diameter neck portion 3A is sheared. The loosening or tightening of the bolt 1 for maintenance, inspection, and so forth is realized by applying the tool on the inner head part 2A after removal of the cap member 5 in the same way as in the foregoing two embodiments.

Since the screw member according to the present invention has the unique construction described, it has the following effects.

(1) Since the collar 4 cannot be removed until the thin neck portion 3 or the small diameter neck portion 3B is sheared with a predetermined tightening torque by applying the screw driving tool on the outer head part 2C, those screws which are not tightened can be readily discovered by visual verification of the presence or absence of the collar 4.

(2) The collar 4 can readily fit into the thin neck portion 3, 3B by means of the cut-out slot 44 in its front face 43 and the notched portion 41 of the skirt 42, and the cap member 5, engaged with the inner head part 2A is inserted within the periphery of the skirt 42 of the collar 4, which, because the width of the notch 41 is narrower than the diameter of the cap 5, prevents the removal of the collar 4, so that there is no possibility of the collar 4 and the cap member 5 being lost during transportation of the article or its fitting work, and moreover it is easy to handle.

(3) Since the outer periphery of the inner head part 2A is surrounded by the cap member 5, even when attempt is made as by applying an ordinary screw driving tool to the inner head part 2A and turning, the tool idles by slippage between the tool and the cap member 5, between the cap member and the outer periphery of the inner head part 2A, as well as the annular stepped part 11, 21, hence tightening is impossible.

(4) In the case of the triple-headed screw part shown in FIGS. 3 and 4, the cap member 5 is already fitted to surround the outer periphery of the inner head part 2A, when the screw driving tool is applied on the middle head part 2B following removal of the collar 4 by separating the outer head part 2C (in the embodiment of FIG. 4, after breaking and removing the auxiliary cap member 5'), so that there is no possibility of the tool being applied on the inner head part 2A by mistake, hence the middle head part 2B can be accurately tightened to break the large diameter neck portion 3A.

(5) When it becomes necessary to loosen or re-tighten the screw which has once been completely tightened, the cap member 5 is broken and removed to expose the inner head part 2A. Therefore, those screws having no cap member 5 fitted thereon indicate that they were subjected to loosening or tightening work, or the cap member 5 was removed therefrom for some reason or other, which provides a convenient check for re-confirmation of the tightening torque at a later date, and prevents any trouble occurring due to non-tightening or excessive tightening.

(6) As shown in FIGS. 1 and 2, when the screw is constructed in such a manner that a space S is provided between the cap member 5 and the inner head part 2A, a protruded part 51 is provided on the inner periphery of the cap member 5 to give the space a specific configuration, and the inner head part 2A can neither be loosened nor tightened without use of a socket type torque wrench having a specific external configuration conformable to the specific configuration of the space, the loosening and tightening work on the screw member 1, 2 can be done efficiently, without removal of the cap member 5, by appropriate control of the use of the special torque wrench.

(7) In the case of the screw part being a nut, there is no possibility of error in the choosing the lead end of the nut owing to the engaged fitting of the collar 4 and the cap member 5, whereby erroneous handling can be avoided.

Incidentally, the head parts 2A, 2B, 2C, the collar 4, and the cap member 5 are differently colored respectively to facilitate visual distinction among them.

What is claimed is:
1. A fastener arrangement comprising:
a threaded screw member having a plurality of heads disposed in a longitudinal direction of the threaded member, each of said plurality of heads being interconnected with its adjacent head by a neck portion, said neck portion being so thin as to be sheared when a tightening torque is applied thereto which exceeds a predetermined value, said threaded member including an annular step portion;

a collar member for partially covering said heads with at least the outermost one of the plurality of heads exposed, said collar member being detachably mounted around the neck portion connected to said outermost head;

said collar member comprising a generally cylindrical portion extending in the longitudinal direction of the threaded member for surrounding the heads except at least said outermost one of the heads, and a generally disk-like end portion having a generally U-shape opening formed therein of a size to receive said neck portion, said end portion being detachably mounted around said neck portion, said cylindrical portion having an opening through which the heads surrounded by said cylindrical portion pass when said U-shape opening is being engaged with said neck portion; and a cap member disposed within the generally cylindrical portion of said collar member, and comprising an annular skirt portion for surrounding at least one of the heads except at least said outermost head with a space provided therebetween, and a flange portion which extends radially inwardly with respect to the longitudinal direction of said threaded member and has a circular, central opening engageable with the annular step portion of said threaded member;

said annular skirt portion having a generally cylindrical, inner surface which defines said space and has a lateral cross section having a protrusion extending radially inwardly so as to prevent a driving portion of a driving tool applicable to said at least one of the heads surrounded by the annular skirt portion from being disengaged when received in said space;

the heads, except at least said outermost head, being substantially enclosed by said collar and cap members when said collar and cap members are mounted on said threaded member.

2. An arrangement in accordance with claim 1, wherein said plurality of heads comprise three or more heads interconnected by corresponding two or more neck portions, said neck portions being so formed that neck portions nearer the outermost head in the longitudinal direction are thinner than neck portions nearer the innermost one of the heads so as to be sheared when a tightening torque is applied thereto which exceeds a lower predetermined value.

3. An arrangement in accordance with claim 1, wherein said cap member comprises a material which is readily rupturable by a cutting tool.

4. An arrangement in accordance with claim 1, wherein said threaded member comprises a bolt including a plurality of heads, a shank having one end portion coupled to said plurality of heads and the other end portion threaded, and an insulating sheath for substantially covering a portion of the shank with the threaded end portion at least partially exposed.

5. An arrangement in accordance with claim 1, wherein said threaded member comprises a nut having a pluralty of heads, said nut including a threaded hole extending in a longitudinal direction of the nut.

6. An arrangement in accordance with claim 1, further comprising a washer member which is held between the innermost one of the plurality of heads and one end of an insulating sheath, said sheath being secured by the shank.

* * * * *